(12) United States Patent
Weissinger et al.

(10) Patent No.: US 10,476,290 B2
(45) Date of Patent: Nov. 12, 2019

(54) CHARGING TWO-TERMINAL PORTABLE ELECTRONIC DEVICES

(71) Applicant: MOTOROLA SOLUTIONS, INC., Chicago, IL (US)

(72) Inventors: Frederick J. Weissinger, Duluth, GA (US); Ryan Baker, Smyrna, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 203 days.

(21) Appl. No.: 15/616,718

(22) Filed: Jun. 7, 2017

(65) Prior Publication Data

US 2018/0358831 A1    Dec. 13, 2018

(51) Int. Cl.
*H02J 7/00* (2006.01)
*G06F 1/26* (2006.01)
*H02J 7/02* (2016.01)

(52) U.S. Cl.
CPC .............. *H02J 7/0072* (2013.01); *G06F 1/26* (2013.01); *H02J 7/0036* (2013.01); *H02J 7/0042* (2013.01); *H02J 7/0045* (2013.01); *H02J 7/0052* (2013.01); *H02J 7/027* (2013.01); *G06F 2213/0042* (2013.01); *H02J 2007/0062* (2013.01)

(58) Field of Classification Search
CPC ......... H02J 7/0036; H02J 7/0072; H02H 3/20
USPC ................................. 320/107, 114, 115, 134
See application file for complete search history.

(56) References Cited

U.S. PATENT DOCUMENTS

| | | | |
|---|---|---|---|
| 5,422,560 A | 6/1995 | Yan | |
| 5,861,729 A | 1/1999 | Maeda et al. | |
| 6,605,926 B2 | 8/2003 | Crisp et al. | |
| 2012/0139477 A1 | 6/2012 | Oglesbee et al. | |
| 2015/0086938 A1 | 3/2015 | Schmid | |
| 2015/0229119 A1* | 8/2015 | Tao | H02H 3/16 361/91.1 |
| 2017/0269148 A1* | 9/2017 | Sporck | H02J 7/0052 |

FOREIGN PATENT DOCUMENTS

| | | |
|---|---|---|
| WO | 2012/011146 | 1/2012 |
| WO | 2015/042323 | 3/2015 |

OTHER PUBLICATIONS

PCT/US2018/031882 International Search Report and Written Opinion of the International Searching Authority dated Aug. 9, 2018 (13 pages).

* cited by examiner

*Primary Examiner* — Edward Tso
*Assistant Examiner* — Aaron Piggush
(74) *Attorney, Agent, or Firm* — Michael Best & Friedrich LLP (57) ABSTRACT

Systems, methods and apparatus for charging a two-terminal portable electronic device. In one example, the system, method, and apparatus include detecting, with a detection circuit, the two-terminal portable electronic device and electrically coupling the two-terminal portable electronic device to a multi-pin universal serial bus connector when the two-terminal portable electronic device is coupled to a receptacle provided by a charger; and charging, with an activation circuit, the two-terminal portable electronic device using a configuration channel terminal of the multi-pin universal serial bus connector upon detection of the two-terminal portable electronic device.

20 Claims, 5 Drawing Sheets

FIG. 6

CHARGING TWO-TERMINAL PORTABLE ELECTRONIC DEVICES

BACKGROUND OF THE INVENTION

With the advent of modern portable electronic devices such as two-way radios, smart telephones, and other communication devices, end users demand increasingly complex, power-intensive functionality. Batteries and other portable energy storage methods continue to scale in energy density to meet demand. Methods for interconnecting and charging electronic devices must likewise scale to offer greater performance and connectivity. Legacy portable devices often provide only a simple pair of bare electrical terminals to a charger for recharging the energy storage system, such as a battery, within these devices. Not all chargers provide a direct battery terminal connection, or two-terminal connection, for charging portable devices. Some battery chargers implement a multi- or many-pin interface, such as the universal serial bus, that require more than two electrical connections for charging or communicating with portable devices. As a result, portable devices designed to be charged through a bare two-terminal interface are incompatible with battery chargers that implement a multi- or many-pin electrical interface such as the universal serial bus connector (for example, a USB-C or universal serial bus type-C connector).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Two-terminal portable electronic devices are not designed to interface with electronic chargers that implement a multi-pin electrical interface such as a universal serial bus connector. Systems and methods described herein provide, among other things, for the detection of a two-terminal portable electronic device when placed in a multi-pin charger receptacle (for example, a universal serial bus type-C connector) and, after sufficiently coupling to the two-terminal portable electronic device, the subsequent charging of the two-terminal portable electronic device. One embodiment provides an apparatus for charging a two-terminal portable electronic device. The apparatus includes a detection circuit to detect the two-terminal portable electronic device and electrically couple the two-terminal portable electronic device to a multi-pin connector of a charger when the two-terminal portable electronic device is coupled to a receptacle provided by the charger; and an activation circuit to charge the two-terminal portable electronic device using a configuration channel terminal of the multi-pin connector upon detection of the two-terminal portable electronic device.

Another embodiment provides a charging system for charging a two-terminal portable electronic device. The charging system includes a charger; a multi-pin connector electrically coupled to the charger; and an apparatus electrically coupled to the multi-pin connector. The apparatus includes a detection circuit to detect the two-terminal portable electronic device and electrically couple the two-terminal portable electronic device to the charger when the two-terminal portable electronic device is coupled to the receptacle; and an activation circuit to charge the two-terminal portable electronic device using a configuration channel terminal of the multi-pin connector upon detection of the two-terminal portable electronic device.

Another embodiment provides a method of charging a two-terminal portable electronic device. The method includes detecting, with a detection circuit, the two-terminal portable electronic device and electrically coupling the two-terminal portable electronic device to a multi-pin universal serial bus connector when the two-terminal portable electronic device is coupled to a receptacle provided by a charger. The method also includes charging, with an activation circuit, the two-terminal portable electronic device using a configuration channel terminal of the multi-pin universal serial bus connector upon detection of the two-terminal portable electronic device.

Figure 1:
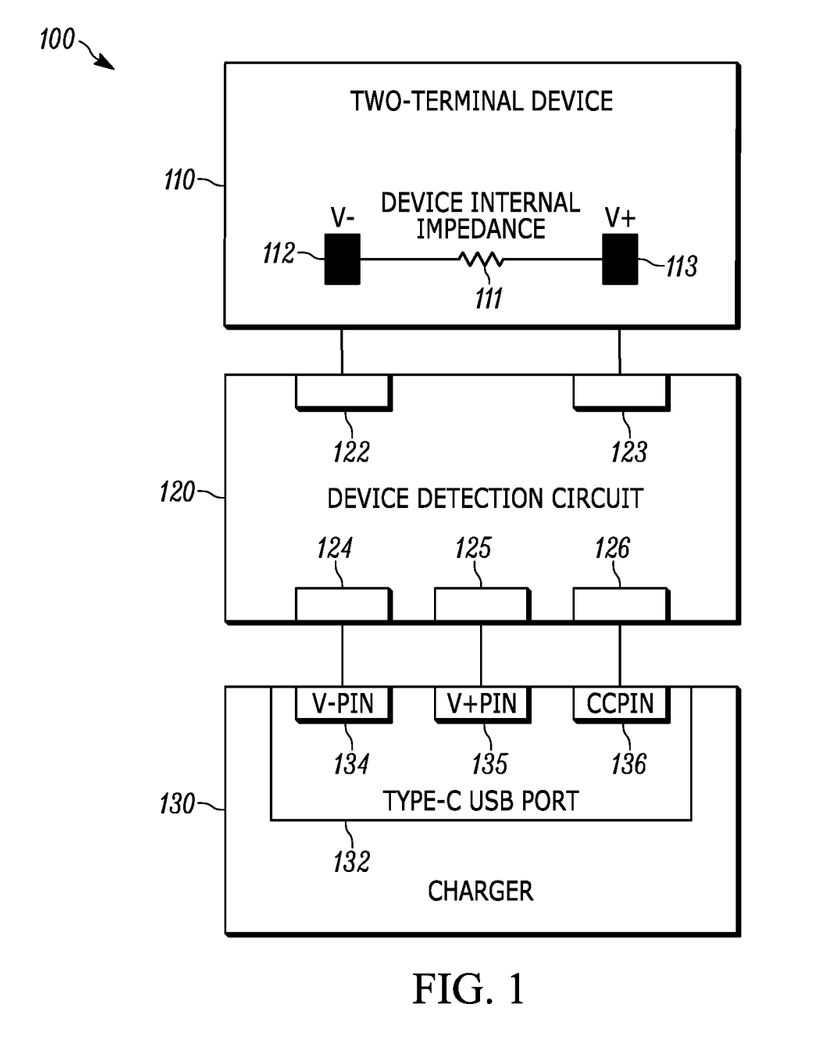
FIG. 1 is a diagram of a charging system illustrating a two-terminal portable electronic device electrically coupled to a charger with a universal serial bus type-C connector, in accordance with some embodiments.

FIG. 1 is a diagram of a charging system 100, in accordance with some embodiments. The charging system 100 includes a two-terminal portable electronic device 110, a device detection circuit 120 and the charger 130 as shown in FIG. 1. As shown in FIG. 1, the two-terminal portable electronic device 110 is coupled to the device detection circuit 120 and the device detection circuit 120 is in turn coupled to the charger 130. In some embodiments, the device detection circuit 120 is integrated with the charger 130. In some embodiments, the device detection circuit 120 is removably coupled to the charger 130. In some embodiments, the device detection circuit 120 is integrated within a receptacle such as a pocket that is configured to receive the two-terminal portable electronic device 110 and electrically couple to the charger 130.

The two-terminal portable electronic device 110 includes an internal impedance 111 coupled between negative terminal 112 and positive terminal 113. The device detection circuit 120 includes terminals 122, 123, 124, 125, and 126. In one example, the terminal 122 is coupled to the negative terminal 112 and the terminal 123 is coupled to the positive terminal 113.

In the example shown, the charger 130 is configured to receive power from an alternating current (AC) source (for example, a wall outlet) and convert the power into direct current (DC) power that can be used for charging portable communications devices such as the two-terminal portable electronic device 110. In some embodiments, the charger 130 includes a universal serial bus type-C connector 132. The universal serial bus type-C connector 132 includes a 24-pin connection of which a first set of 12-pins are used for an upstream connection and a second set of 12-pins are used for a downstream connection. In the example shown in FIG. 1, the universal serial bus type-C connector 132 includes a negative pin 134, a positive pin 135, and a configuration channel (CC) pin 136. In some embodiments, the negative pin 134 is coupled to the terminal 124, the positive pin 135 is coupled to the terminal 125 and the configuration channel pin 136 is coupled to the terminal 126.

In some embodiments, the charging system 100 leverages an upstream channel (for example, the configuration channel) of the universal serial bus type-C connector 132 by sending information about the two-terminal portable electronic device 110 to the charger 130 thereby initiating charging of the two-terminal portable electronic device 110. In some embodiments, the charger 130 remains powered down for almost all of the time when the two-terminal portable electronic device 110 is not coupled or placed in a charging pocket 116 (see FIG. 2) associated with the charger 130.

Figure 2:
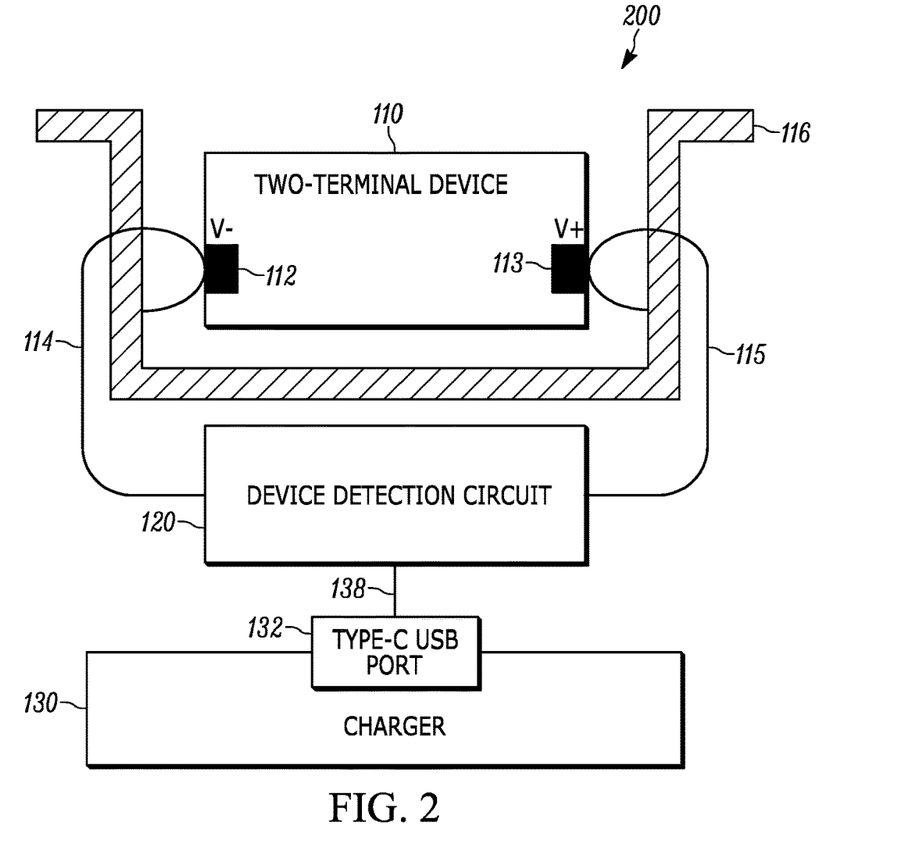
FIG. 2 is a diagram of a charging system for a two-terminal portable electronic device, in accordance with some embodiments.

FIG. 2 is a diagram of a charging system 200, in accordance with some embodiments. The charging system 200 includes the two-terminal portable electronic device 110, a charging pocket 116, the device detection circuit 120 and the charger 130 having a universal serial bus type-C connector 132. In one example, the charging pocket 116 includes the pocket contact 114 and the pocket contact 115. In some embodiments, one end of the pocket contact 114 and the pocket contact 115 are configured to couple with the negative terminal 112 and the positive terminal 113, respectively, when the two-terminal portable electronic device 110 is placed in the charging pocket 116. The remaining end of the pocket contact 114 and the pocket contact 115 are coupled to terminals 122 and 123, respectively of the device detection circuit 120. Additionally, device detection circuit 120 is coupled to the universal serial bus type-C connector 132 using a cable 138.

Figure 3:
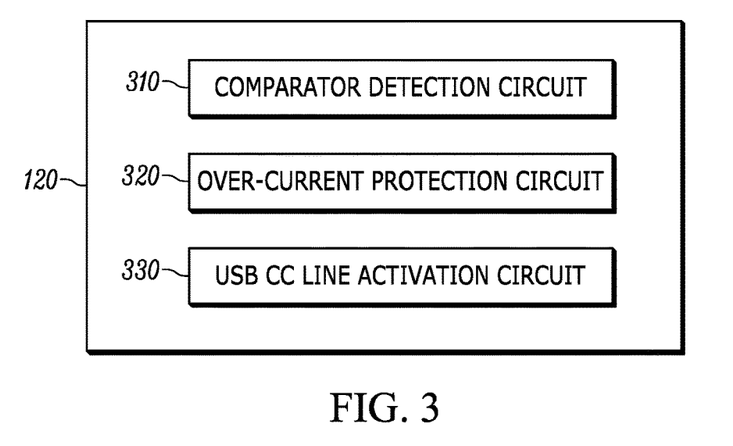
FIG. 3 is a block diagram of a device detection circuit, in accordance with some embodiments.

FIG. 3 is a block diagram of the device detection circuit 120, in accordance with some embodiments. In the example shown, the device detection circuit 120 includes a comparator detection circuit 310, an over-current protection circuit 320 and a universal serial bus configuration channel line activation circuit 330 (for example, a driver circuit). The comparator detection circuit 310 is configured to accurately detect two-terminal portable electronic device 110 insertion events. The over-current protection circuit 320 engages when the two-terminal portable electronic device 110 draws excessive current. In the event the two-terminal portable electronic device 110 begins to draw excessive current, the universal serial bus configuration channel line activation circuit 330 is deactivated thereby disabling charging of the two-terminal portable electronic device 110 until the two-terminal portable electronic device 110 that may be malfunctioning is removed. The system recovers automatically after the malfunctioning device is removed.

Figure 4:
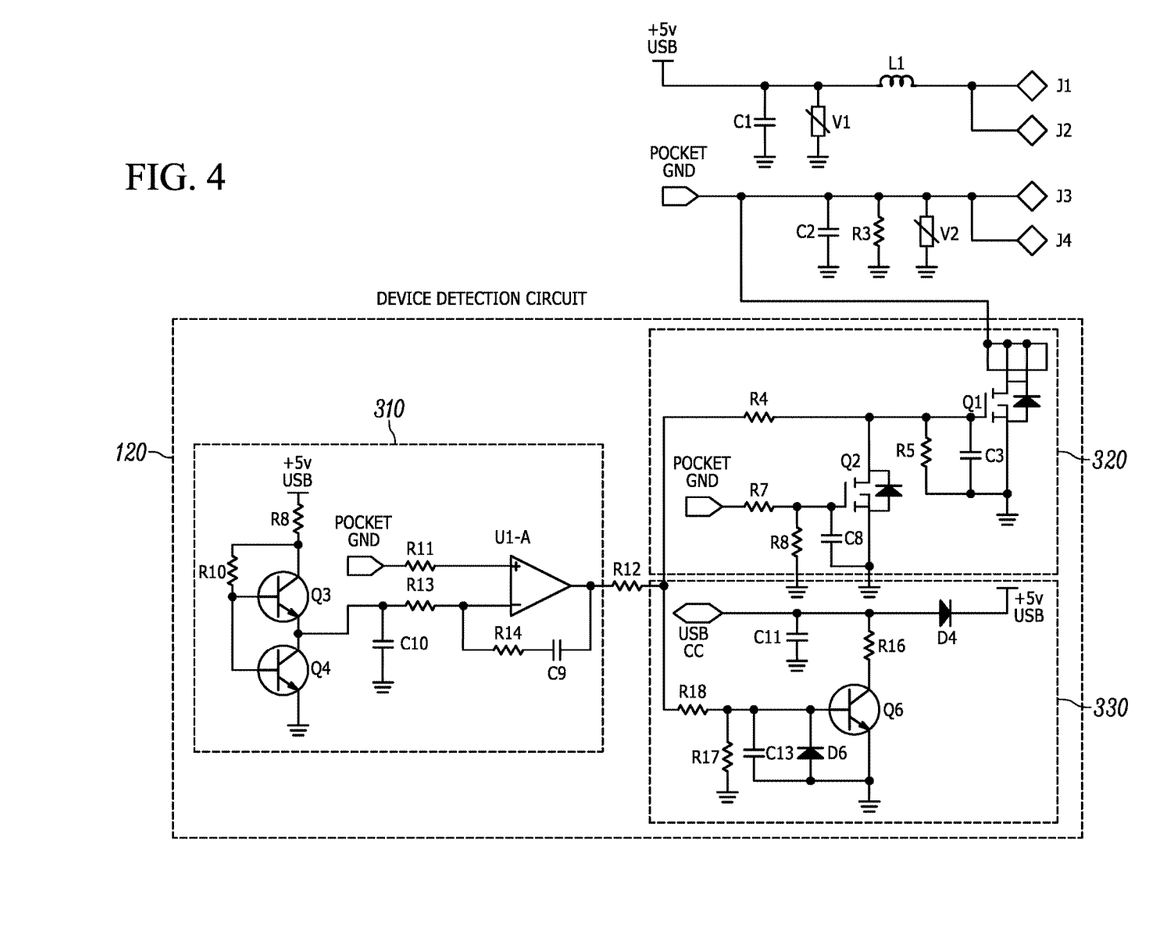
FIG. 4 illustrates one example of a device detection circuit, in accordance with some embodiments.

FIG. 4 illustrates one example of the device detection circuit 120, in accordance with some embodiments. In some embodiments, the pocket contact 114 corresponds to either contact J3 or contact J4 and the pocket contact 115 corresponds to either of the contacts J1 and J2. In one example, the device detection circuit 120 is coupled to contacts J1, J2, J3, and J4. In some embodiments, one of the pairs of contacts J1, J3, and J2, J4 can be used to interface with the two-terminal portable electronic device 110. In one example, when the two-terminal portable electronic device 110 is not placed within the charging pocket 116 (shown in FIG. 2) there is no electrical connection between the contact J1 and the contact J3. In some embodiments, the internal impedance 111 of the two-terminal portable electronic device 110 is approximately 4.7 kilo-ohms when the rechargeable battery within the two-terminal portable electronic device 110 is fully charged. In some embodiments, the internal impedance 111 of the two-terminal portable electronic device 110 may be as low as 10 ohms when the charge within the rechargeable battery is low. In some embodiments, when the two-terminal portable electronic device 110 is placed within the charging pocket 116 an electrical connection is established between the pocket contact J1 and the pocket contact J3 and the two-terminal portable electronic device 110 is detected by the device detection circuit 120. The device detection circuit 120 is powered on a +5V line fed by one of pins of the universal serial bus type-C connector 132. When the two-terminal portable electronic device 110 is detected by the device detection circuit 120, the two-terminal portable electronic device 110 begins to get charged.

The device detection circuit 120 includes a low power comparator U1-A that has two inputs namely a positive input (+) and a negative input (−). In some embodiments, the positive input (+) is coupled to a pocket ground and the negative input (−) is coupled to a reference voltage. In some embodiments, the low power comparator U1-A compares the electrical potential at the positive input and the negative input to determine which of the inputs has a higher electrical potential. In some embodiments, when the positive input (+) is high and the negative input (−) is low, the output of the low power comparator U1-A is high. On the other hand, when the positive input is low and the negative input is high, the output of the low power comparator U1-A is low.

In some embodiments, when the two-terminal portable electronic device 110 is not placed in the charging pocket 116, the pocket ground (POCKET GND shown in FIG. 4) will be floating and be approximately 0V. The low power comparator U1-A receives at the positive input (+) an input coming through resistor R11 that is essentially zero. Additionally, the low power comparator U1-A receives at the negative input (−) a reference voltage generated by resistor R13 and a cascaded array of transistors Q3, and Q4. The transistors Q3 and Q4 are designed such that the output voltage between them is approximately 25 mV and is maintained as a constant reference voltage. As a result, when the device is not placed in the charging pocket 116, the positive input (+) of the low power comparator U1-A has a lower voltage compared to the negative input (−) of the low power comparator U1-A.

In some embodiments, when the two-terminal portable electronic device 110 is placed in the charging pocket 116, a potential difference develops across internal impedance 111 and the voltage at the positive input (+) of the low power comparator U1-A is higher than the reference voltage of 25 mV. The low power comparator U1-A drives the output voltage across R12 higher than the instance before the two-terminal portable electronic device 110 was placed in the charging pocket 116. The output of resistor R12 is fed to a top portion and a bottom portion of the device detection circuit 120. The bottom portion of the device detection circuit 120 provides a communication circuit that provides an upstream connection through transistor Q6 to the charger 130. In some embodiments, the transistor Q6 is enabled to set a voltage on the configuration channel (CC) line of the universal serial bus type-C connector 132. The charger 130 monitors the configuration channel (CC) line voltage in real time and waits until the voltage reaches a predetermined window of voltage. When the voltage on the configuration channel (CC) line reaches the predetermined window of voltage, the charger 130 determines that there is a two-terminal portable electronic device 110 present in the charging pocket 116 that needs charging. Consequently, the upstream charger 130 is enabled to facilitate charging of the two-terminal portable electronic device 110.

In some embodiments, the top portion of the device detection circuit 120 is coupled to the pocket contact J3 and J3 that in turn corresponds to pocket contact 114 as shown in FIG. 2. The top portion of the device detection circuit 120 includes metal-oxide-semiconductor field-effect transistors (MOSFET) Q1 and Q2. In some embodiments, the transistor Q1 is a pull-down, in-channel charging switch. When the output of the low power comparator U1-A is high that allows the current to flow back upstream to the charger 130. In some embodiments, when the device draws excessive current, a potential difference forms at the device negative contact or pocket ground. The potential difference enables the MOSFET, which pulls the comparator output to a GND or low state, disabling the configuration channel (CC). When the malfunctioning device is removed, the circuit automatically resumes normal operation awaiting device detection.

Figure 5:
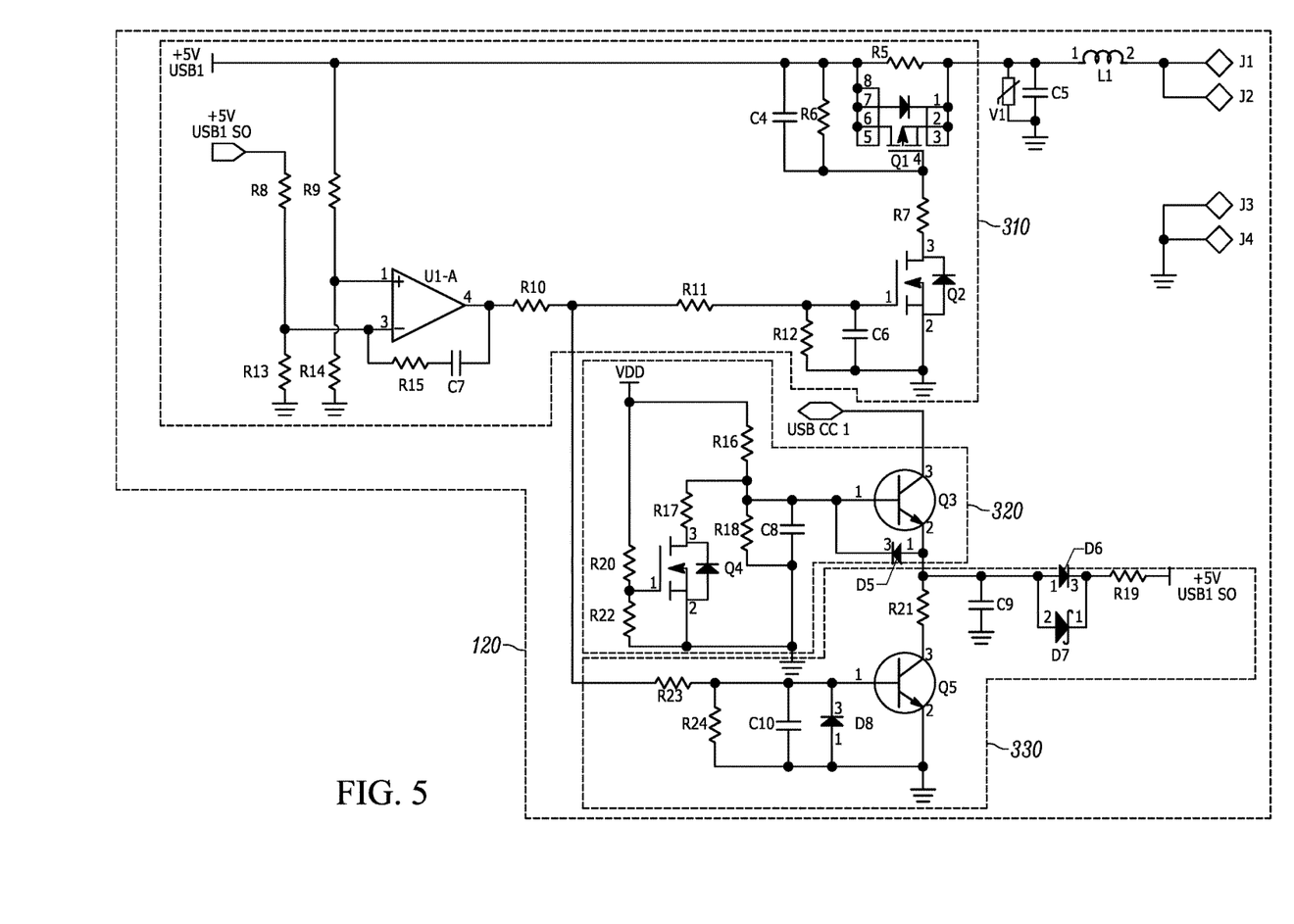
FIG. 5 illustrates another example of a device detection circuit, in accordance with some embodiments.

FIG. 5 illustrates one example of the device detection circuit 120, in accordance with some embodiments. In some embodiments, the device detection circuit 120 shown in FIG. 5 is used to charge a two-terminal portable electronic device 110 in a manner similar to that explained in FIG. 4. In some embodiments, the device detection circuit 120 shown in FIG. 5 includes a comparator detection circuit 310, an over-current protection circuit 320, and a universal serial bus configuration channel line activation circuit 330. The low power comparator U1-A monitors the impedance of the charging pocket 116. When no two-terminal portable electronic device 110 is present in the charging pocket 116, the charging pocket 116 is at infinite resistance to ground. The low power comparator's inputs remain at the default low output. When the two-terminal portable electronic device 110 with a finite impedance is inserted into the charging pocket 116, the current flows through it and the low power comparator U1-A reads a change in the pocket impedance. The output of the low power comparator U1-A switches to high thereby enabling the universal serial bus configuration channel line activation circuit 330.

In some embodiments, the potential difference across a sense resistor R5 (for example, a 300-ohm resistor) is determined. At idle, the voltages on either side of the sense resistance R5 is equivalent. The input resistance network of the low power comparator U1-A is biased to ensure the "low" input is above the "high" input and the output follows "low" to hold the system "off". In some embodiments, when a device impedance within a range of detection such as a two-terminal portable electronic device 110 is inserted into the charging pocket 116, a voltage potential develops across the sense resistor R5. The comparator's inputs are biased such that the "high" input rises above the "low" input potential and the output is set to a "high" state. In some embodiments, the device detection circuit 120 provided in FIG. 5 is capable of detecting device impedances from 15 k ohm down to as low as 1 ohm. In some embodiments, the comparator detection circuit 310 is capable of detecting any resistance beneath 15 k, if the over-current protection circuit 320 is removed from the device detection circuit 120.

In some embodiments, over-current protection circuit 320 engages when the two-terminal portable electronic device 110 in the charging pocket 116 draws excessive current. After successful detection of the two-terminal portable electronic device 110, the circuit power holds the transistor Q3 in saturation, or an active "high" state. In some embodiments, when the voltage collapses past a "shutdown" voltage, the circuit power is no longer able to hold Q3 in saturation. When Q3 shuts off, the universal serial bus configuration channel line activation circuit 330 is deactivated thereby disabling the circuit output until the two-terminal portable electronic device 110 that may be malfunctioning is removed from the charging pocket 116. In some embodiments, the universal serial bus configuration channel line activation circuit 330 will auto-recover to idle state upon removal. In some embodiments, the shutdown voltage is configurable using the resistor bias network R16/R18.

In some embodiments, so long as the two-terminal portable electronic device 110 with detectable impedance remains electrically coupled to the pocket contacts and the over-current protection circuit 320 does not trip, the device detection circuit 120 in FIG. 5 is latched on and will conduct current to the two-terminal portable electronic device 110.

Figure 6:
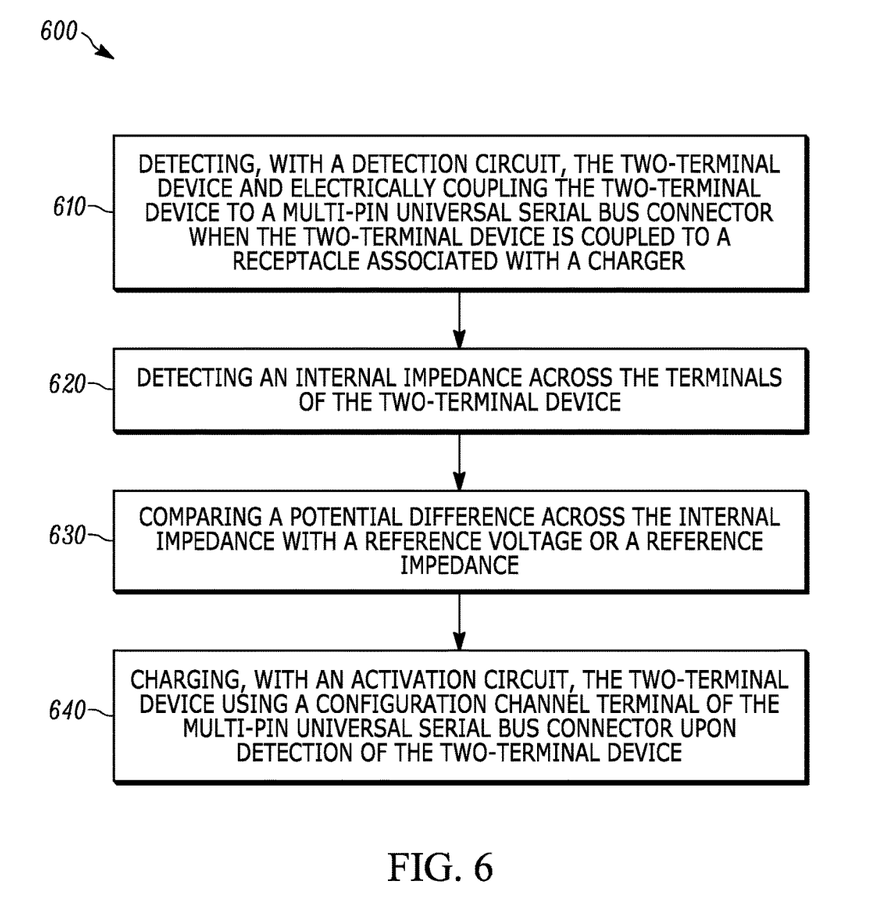
FIG. 6 is a flowchart of a method of charging a two-terminal portable electronic device, in accordance with some embodiments.

FIG. 6 is a flowchart of a method 600 of charging a two-terminal portable electronic device 110, in accordance with some embodiments. At block 610, the method 600 includes detecting, with the device detection circuit 120, the two-terminal portable electronic device 110 and electrically coupling the two-terminal portable electronic device 110 to the multi-pin universal serial bus connector (for example, the universal serial bus type-C connector 132) when the two-terminal portable electronic device 110 is coupled to a receptacle (for example, the charging pocket 116) that may be provided by the charger 130. In some embodiments, the device detection circuit 120 is powered using configuration channel (CC) line of the universal serial bus type-C connector 132 and no other external power source is needed.

At block 620, the method 600 includes detecting an internal impedance 111 across the negative terminal 112 and the positive terminal 113 of the two-terminal portable electronic device 110. In some embodiments, the device detection circuit 120 is configured to be able to detect a two-terminal portable electronic device 110 with an internal impedance 111 of up to about 15 kilo-ohms.

At block 630, the method 600 includes comparing a potential difference across the internal impedance 111 to a reference voltage. In some embodiments, the device detection circuit 120, via the universal serial bus type-C connector 132, is configured to power down into an idle state when the two-terminal portable electronic device 110 is removed from the charging pocket 116.

In some embodiments, the method 600 includes powering the universal serial bus configuration channel line activation circuit 330 when the potential difference across the internal impedance 111 is greater than the reference voltage. In some embodiments, the method 600 includes electrically coupling the two-terminal portable electronic device 110 to the multi-pin universal serial bus connector when receiving, with a configuration channel pin 136, an input from the universal serial bus configuration channel line activation circuit 330. In some embodiments, the device detection circuit 120 is configured to accept an external power supply from an alternating current adapter with a universal serial bus type-C downstream port to power the detection circuit and charge a two-terminal portable electronic device 110.

At block 640, the method 600 includes charging, with the activation circuit (for example, the universal serial bus configuration channel line activation circuit 330), the two-terminal portable electronic device 110 using a configuration channel pin (for example, configuration channel pin 136) of the universal serial bus type-C connector 132 upon detection of the two-terminal portable electronic device 110. In some embodiments, the method 600 includes automatically switching between a detection mode and a charging mode when the two-terminal portable electronic device 110 is detected as being placed in the charging pocket 116. In some embodiments, the device detection circuit 120 is configured to alternate between a detection circuit to provide charging after detection of a two-terminal portable electronic device 110 and a linear regulator to provide low idle power consumption.

One advantage of the systems and methods provided herein is that the charger 130 can be kept powered down within a tight margin when a two-terminal portable electronic device 110 is not placed in the charging pocket 116.

In the foregoing specification and accompanying drawings, one or more embodiments are described and illustrated. These embodiments are not limited to the specific details provided herein and may be modified in various ways. Furthermore, other embodiments may exist that are not described herein. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable media. Similarly, embodiments described herein may be implemented as non-transitory, computer-readable media storing instructions executable by one or more electronic processor to perform the described functionality.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of charging a two-terminal portable electronic device, the method comprising:

detecting, with a detection circuit, the two-terminal portable electronic device and electrically coupling the two-terminal portable electronic device to a multi-pin universal serial bus connector when the two-terminal portable electronic device is coupled to a charging pocket provided by a charger; and charging, with an activation circuit, the two-terminal portable electronic device using a configuration channel terminal of the multi-pin universal serial bus connector upon detection of the two-terminal portable electronic device.

2. The method of claim 1, further comprising:
detecting an internal impedance across terminals of the two-terminal portable electronic device.

3. The method of claim 2, further comprising:
comparing a potential difference across the internal impedance with a reference voltage.

4. The method of claim 3, further comprising:
powering the activation circuit when the potential difference across the internal impedance is greater than the reference voltage.

5. The method of claim 1, wherein electrically coupling the two-terminal portable electronic device to the multi-pin universal serial bus connector includes receiving, with a configuration channel pin, an input from the activation circuit.

6. An apparatus for charging a two-terminal portable electronic device, the apparatus comprising:
a detection circuit to detect the two-terminal portable electronic device and electrically couple the two-terminal portable electronic device to a multi-pin connector of a charger when the two-terminal portable electronic device is coupled to a charging pocket provided by the charger; and an activation circuit to charge the two-terminal portable electronic device using a configuration channel terminal of the multi-pin connector upon detection of the two-terminal portable electronic device.

7. The apparatus of claim 6, wherein the detection circuit is configured to detect an internal impedance across terminals of the two-terminal portable electronic device.

8. The apparatus of claim 7, wherein the internal impedance is less than or equal to 15 kilo-ohms.

9. The apparatus of claim 7, wherein the detection circuit includes a low power comparator to compare a potential difference across the internal impedance with a reference voltage.

10. The apparatus of claim 9, wherein the low power comparator is configured to power the activation circuit when the potential difference across the internal impedance is greater than the reference voltage.

11. The apparatus of claim 6, wherein the multi-pin connector includes a universal serial bus type-C connector.

12. The apparatus of claim 11, wherein the universal serial bus type-C connector including a configuration channel pin, the configuration channel pin configured to receive an input from the activation circuit.

13. A charging system for charging a two-terminal portable electronic device, the charging system comprising:
a charger including a charging pocket;
a multi-pin connector electrically coupled to the charger; and
an apparatus electrically coupled to the multi-pin connector, the apparatus comprising:
a detection circuit to detect the two-terminal portable electronic device and electrically couple the two-terminal portable electronic device to the charger when the two-terminal portable electronic device is coupled to the charging pocket, and
an activation circuit to charge the two-terminal portable electronic device using a configuration channel terminal of the multi-pin connector upon detection of the two-terminal portable electronic device.

14. The charging system of claim 13, wherein the detection circuit is configured to detect an internal impedance across terminals of the two-terminal portable electronic device.

15. The charging system of claim 14, wherein the internal impedance is less than or equal to 15 kilo-ohms.

16. The charging system of claim 14, wherein the detection circuit includes a low power comparator to compare a potential difference across the internal impedance with a reference voltage.

17. The charging system of claim 14, wherein the detection circuit includes a sense resistor.

18. The charging system of claim 16, wherein the low power comparator is configured to power the activation circuit when the potential difference across the internal impedance is greater than the reference voltage.

19. The charging system of claim 13, wherein the multi-pin connector includes a universal serial bus type-C connector.

20. The charging system of claim 19, wherein the universal serial bus type-C connector including a configuration channel pin, the configuration channel pin configured to receive an input from the activation circuit.

* * * * *